(No Model.)
G. C. DRESSEL.
SIGNAL LANTERN.
No. 348,623. Patented Sept. 7, 1886.
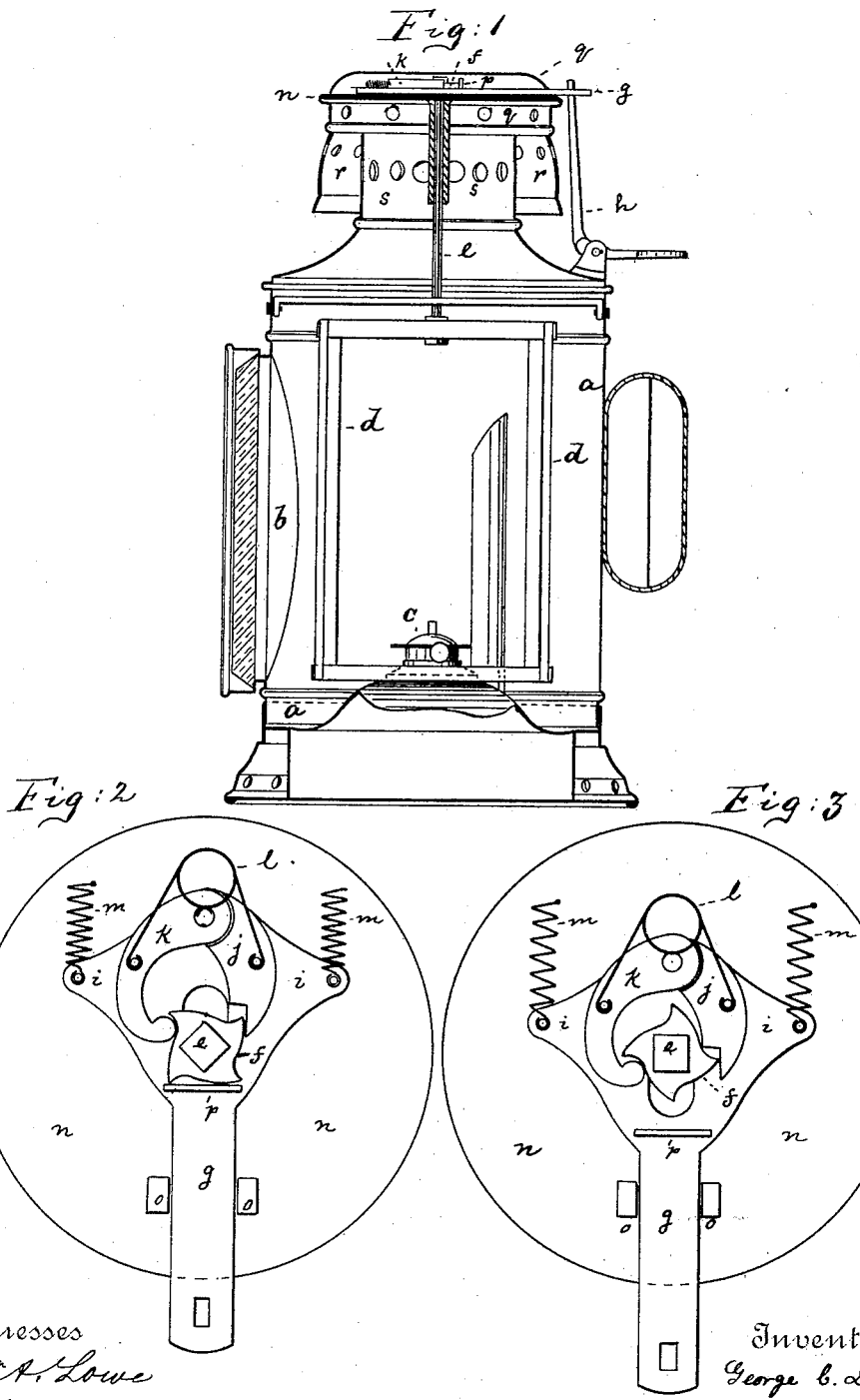
Witnesses
Wm A. Lowe
Rob H. Ray
Inventor
George C. Dressel
by his attorneys
Roeder & Brieser

UNITED STATES PATENT OFFICE.

GEORGE C. DRESSEL, OF NEW YORK, N. Y.

SIGNAL-LANTERN.

SPECIFICATION forming part of Letters Patent No. 348,623, dated September 7, 1886.

Application filed February 2, 1886. Serial No. 190,571. (No model.)

*To all whom it may concern:*

Be it known that I, GEORGE C. DRESSEL, of the city of New York, county and State of New York, have invented a new and Improved Signal-Lantern, of which the following specification is a full, clear, and exact description.

This invention relates to a signal-lantern so constructed that differently-colored panes of glass may be interposed between the lamp and the eye.

The invention consists in the various elements of improvement hereinafter more fully pointed out.

In the accompanying drawings, Figure 1 is a vertical central section, partly in side view, of a lantern provided with my improvement. Figs. 2 and 3 are top views of the operating mechanism, showing the same in different positions.

The letter *a* represents the case of a lantern, having an eye, *b*, and a lamp, *c*.

*d* is a square frame suspended from a rod, *e*, and adapted to be revolved. The frame *d* contains differently-colored panes of glass, and by revolving the frame a different pane is interposed between eye and lamp, and thus the lantern is made to throw out a differently-colored light.

The mechanism for revolving the rod *e*, and with it the frame *d*, is as follows: The upper end of rod *e* is embraced by and rigidly keyed to a star-wheel, *f*, having four curved teeth, or as many teeth as there are panes in frame *d*. Directly beneath the star-wheel the rod *e* extends through the slot of a horizontal bar, *g*, the free end of which is engaged by a bent lever, *h*, pivoted to the case *a*, and terminating in a thumb-piece. The bar *g* has an enlarged head, *i*, where it embraces rod *e*, and to the upper end of this head there are pivoted two pawls, *j k*, as shown. The pawl *j* is squared at its free end to form a shoulder, while the pawl *k* is hook-shaped.

*l* is a coiled spring attached to the pawls, and having a tendency to draw them together. Two springs, *m*, secured to the head *i* and to a fixed base-plate, *n*, draw the parts into the position shown in Fig. 2.

*o o* are a pair of guide-rails, secured to plate *n* to the right and left of bar *g*.

The operation of the parts is as follows: When the thumb-piece on lever *h* is depressed, the lever is swung backward and will draw bar *g* out. As the pawls are pivoted to the bar, they will be moved along with it. The shoulder on pawl *j* will now come in contact with one of the teeth of the star-wheel and turn the wheel around one-eighth of a revolution, (from the position shown in Fig. 2 to that shown in Fig. 3.) At the same time the pawl *k* will have engaged the concave side of the tooth diametrically opposite to that which is engaged by pawl *j*. On the release of lever *h* the springs *m* will draw the rod *g* forward, and during this motion the pawl *k* will revolve the star-wheel an additional eighth of a revolution. In this way a complete quarter-revolution is made by star-wheel *f* each time the thumb-piece is depressed and released. A stop, *p*, on bar *g* comes in contact with the star-wheel *f* when the parts are at rest, and takes the strain from rod *e*.

It will be seen that the pawl *j* always remains at one side of the teeth of the star-wheel and pushes the same, while the pawl *k* passes around such teeth to the opposite side to pull the same. The motion given by this mechanism is simple and positive.

The entire mechanism is located within the space inclosed by a double cap or cover, *q*, which has lateral air-holes to admit fresh air, which will keep the parts cool. A depending flange, *r*, beneath the cap *q*, is also provided with air-holes to discharge the products of combustion received from the perforated neck *s* of the lamp, which is surrounded by said flange.

I claim as my invention—

1. The combination, with a lantern provided with plate *n*, of frame *d* and rod *e*, with star-wheel *f*, and with sliding bar *g*, carrying pawls *j k*, adapted to engage said star-wheel, substantially as specified.

2. The combination, with a lantern provided with plate *n*, of frame *d*, rod *e*, star-wheel *f*, slotted bar *g*, lever *h*, pawls *j k*, and springs *l m*, substantially as specified.

3. The combination, with a lantern provided with plate *n*, of frame *d*, rod *e*, bar *g*, pawls *j k*, star-wheel *f*, springs *l m*, and stop *p*, substantially as specified.

GEO. C. DRESSEL.

Witnesses:
 ROBT. H. ROY,
 F. V. BRIESEN.